United States Patent [19]

Dankowski

[11] 4,190,105
[45] Feb. 26, 1980

[54] HEAT EXCHANGE TUBE

[76] Inventor: Gerhard Dankowski, Rte. 2, Box 59A, Royse City, Tex. 75089

[21] Appl. No.: 831,735

[22] Filed: Sep. 9, 1977

Related U.S. Application Data

[63] Continuation-in-part of Ser. No. 713,352, Aug. 11, 1976, Pat. No. 4,063,431.

[51] Int. Cl.² ............................................. F28F 3/12
[52] U.S. Cl. ...................................... 165/179; 138/38
[58] Field of Search ........................... 165/179; 138/38

[56] References Cited

U.S. PATENT DOCUMENTS

| 2,895,508 | 7/1959 | Drake | 138/38 |
|---|---|---|---|
| 2,929,408 | 3/1960 | Weatherwax et al. | 138/38 |
| 3,636,982 | 1/1972 | Drake | 138/38 |
| 3,857,680 | 12/1974 | Porta et al. | 165/179 |
| 3,865,184 | 2/1975 | Grover | 165/179 |
| 3,871,407 | 3/1975 | Bykov et al. | 165/179 |
| 4,031,602 | 6/1977 | Cunningham et al. | 165/179 |

FOREIGN PATENT DOCUMENTS

| 8182 | of 1894 | United Kingdom | 138/38 |
|---|---|---|---|
| 132584 | 8/1919 | United Kingdom | 138/38 |

Primary Examiner—Lloyd L. King
Attorney, Agent, or Firm—Richards, Harris & Medlock

[57] ABSTRACT

A heat exchange coil for use in engine radiators or other heat exchange units is provided. The coil includes a heat exchange tube with an insert fitted therein. The insert includes a longitudinal core, with a plurality of fins depending radially from the core. The fins have a tip section formed with a curved contour but with an outer diameter slightly larger than the inside diameter of the tube. The fins are sufficiently thin to permit flexing of the tip sections to take on the contour of the inner surface of the tube when inserted into the tube. In another embodiment of the invention, the insert includes a longitudinal core with a plurality of fins having bifurcated ends. The fins depend radially from the core. The bifurcated ends of the fins are curved in opposite directions and are flexible to permit insertion into the heat exchange tube. The outer diameter defined by the curved ends of the bifurcated fins is slightly larger than the inside diameter of the tube such that upon insertion into the tube, positive heat exchange contact is obtained between the ends of the fins and the inner wall of the tube.

6 Claims, 8 Drawing Figures

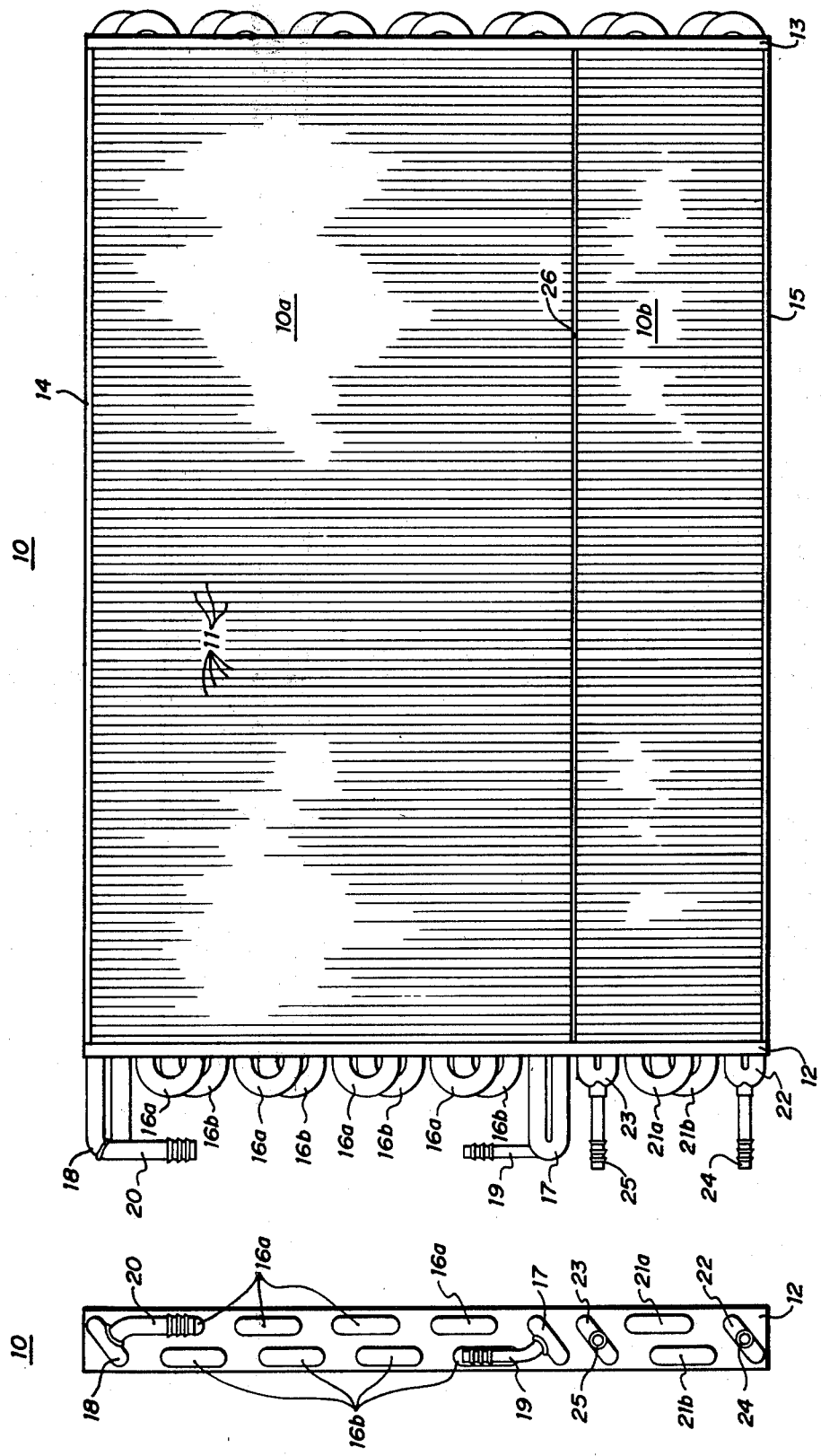

HEAT EXCHANGE TUBE

REFERENCE TO RELATED APPLICATION

This application is a continuation-in-part of application Ser. No. 713,352, filed Aug. 11, 1976, now U.S. Pat. No. 4,063,431.

FIELD OF THE INVENTION

This invention relates to air-cooled heat exchange units for automotive vehicles, and more particularly to the heat exchange tubes for use in such heat exchangers.

BACKGROUND OF THE INVENTION

Prior Art

Cooling systems for automobile engines have long been in use wherein the liquid coolant is delivered by a pump to the cylinder block, and directed forward along the row of cylinders to a thermostat. The thermostat controls the flow of the coolant from the engine block to a radiator, where a heat exchange occurs between the coolant and an air flow created by the combined effect of the forward motion of the vehicle and an engine fan.

Also well known are air conditioning systems for automotive engines, wherein a high pressure refrigerant vapor is discharged from a compressor in a superheated state and directed to a heat exchanger known as a condenser. There the refrigerant vapor is condensed through a heat exchange with a liquid coolant or the surrounding atmosphere. The liquid refrigerant is collected in a receiver in liquid communication with a thermostatic expansion valve. The valve controls the flow of the liquid refrigerant to a heat exchanger known as an evaporator, where a transfer of heat occurs between the refrigerant and the space to be refrigerated. Vaporized refrigerant then is supplied to the suction side of the compressor where the cycle is repeated.

A recurring problem in automotive engines is the overheating of the engine and lubricants, particularly under load conditions including air conditioning and the towing of trailers. To overcome the heating problem, the capacity and number of circulation coils of the engine radiator has been increased, and a bottom tank has been added to the radiator to accommodate an interchange of heat between the coolant and the oil. Under load conditions, however, a further problem has been encountered. The engine or transmission oil may impart excessive heat to the coolant, thereby overheating the engine.

A further improvement of transmission and engine oil cooling systems has been the addition of air cooled heat exchangers. Typical of these are those disclosed in U.S. Pat. No. 2,502,554 to Bonanni; U.S. Pat. No. 3,334,704 to Geherke; and U.S. Pat. No. 2,554,437 to Alexander. The Bonanni patent discloses an oil cooling apparatus including an air cooled heat exchanger and a supplemental fan mounted forward of the engine radiator. The patents to Alexander and Geherke disclose an air cooled heat exchanger for cooling engine oil which is mounted forward of the engine radiator. Each of these systems has alleviated but not satisfactorily elminated the overheating problem.

In each of these systems, the heat exchanger is composed of a plurality of tubes or a single continuous tube through which the fluid is directed. Cooling fins are attached to the outer surface of the tubes and heat conducted from the fluid to the tube is carried into the fin and dissipated to the surrounding atmosphere. To improve this heat dissipation process, rigid cores have been inserted into the tubes to assist in the transfer of heat from the fluid carried in the tube to the tube's surface.

These inserts have generally taken the form of coiled wire or cross plates with the longitudinal edges of the plates engaging the inner wall of the tube. Wire inserts have not been very effective in that the wire is positioned near the wall of the tube and therefore does not assist in the transfer of heat from the fluid moving in the center of the tube to the tube wall. Because of the close tolerances which must be maintained in order to insure continuous contact between the edges of the plate inserts and the inner wall of the tube, heat exchangers incorporating these inserts have not been economical to produce. Where the tolerances required to assure contact have not been maintained, these inserts have not provided the heat exchange properties for which they are intended.

SUMMARY OF THE INVENTION

The present invention provides a heat exchange coil for use in engine radiators or other heat exchange units. The coil includes a heat exchange tube with an insert fitted therein. The insert includes a longitudinal core, with a plurality of fins depending radially from the core. The fins have a tip section formed with a curved contour but with an outer diameter slightly larger than the inside diameter of the tube. The fins are sufficiently thin to permit flexing of the tip sections to take on the contour of the inner surface of the tube when inserted into the tube. Because the insert is slightly oversized relative to the inside diameter of the tube, the insert has the tendency to forcibly engage and thereby lay against the inside surface of the tube to provide improved heat conduction from the insert to the tube.

In accordance with another embodiment of the invention, the insert includes a longitudinal core with a plurality of fins having bifurcated ends. The fins depend radially from the core. The bifurcated ends of the fins are curved in opposite directions and are flexible to permit insertion into the heat exchange tube. The outer diameter defined by the curved ends of the bifurcated fins is slightly larger than the inside diameter of the tube such that upon insertion into the tube, positive heat exchange contact is obtained between the ends of the fins and the inner wall of the tube.

In still another embodiment of the invention, the heat exchange tube is eliminated by forming a longitudinal core having a plurality of bifurcated fins extending radially therefrom. The tips of each fin are extended to contact the tip of an adjacent fin. The tips are joined to form one monolithic structure having a plurality of fluid channels through which the coolant or lubricant passes.

In each embodiment of the invention, heat is conducted from the fluid carried by the heat exchange tube to the fins. In the embodiments where an insert is fitted within a heat exchange tube, the heat is conducted from the fins to the walls of the tube where it is dissipated to the surrounding atmosphere. In the embodiment where the heat exchange tube is eliminated by the closed construction of the insert, heat is conducted to the outer surfaces of the bifurcated fins for dissipation to the atmosphere.

DESCRIPTION OF THE DRAWINGS

For a more complete understanding of the present invention and for further objects and advantages thereof, reference may now be had to the following description taken in conjunction with the accompanying drawings in which:

FIG. 1 is a front pictorial view of a heat exchanger according to the invention;

FIG. 2 is a side view of the heat exchanger of FIG. 1;

DESCRIPTION OF PREFERRED EMBODIMENTS

Figure 3:
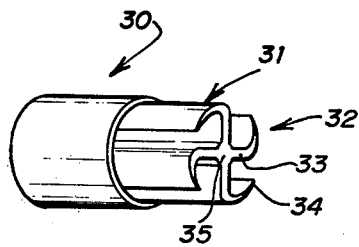
FIG. 3 is an illustration of a fluid conduit partially cut away to reveal a heat exchanger insert.

FIGS. 1 and 2 illustrate the front and a side view, respectively, of a heat exchanger 10 according to the invention.

The heat exchanger 10 is comprised of parallel and vertically disposed but horizontally spaced flat metallic fins 11. Partially enclosing the metallic fins are side plates 12 and 13, and fin guards 14 and 15. Passing horizontally through the metallic fins and the side plates are two layers of interconnected U-shaped conduits 16a and 16b, which are joined by U-shaped connectors 17 and 18 to hose fittings 19 and 20, respectively. Vertically spaced from conduits 16a and 16b are two layers of U-shaped conduits 21a and 21b, which also pass horizontally through the metallic fins and side plates. Conduits 21a and 21b are joined by U-shaped connectors 22 and 23 to hose fittings 24 and 25, respectively.

Although conduits of a particular shape have been described, it is to be understood that other conduit orientations and shapes may be used with equal effectiveness. For example, conduits 16a, 16b and 21a, 21b may be horizontally or vertically disposed spirals.

An air space 26 is formed by severing plural ones of fins 11 along a horizontal line intermediate to conduits 16a, 16b and conduits 21a, 21b. The heat exchange between the upper and lower fin sections thereby is interrupted, and heat exchanger 10 effectively is partitioned into a condenser 10a and an air cooler 10b.

In the preferred embodiment described herein, fins 11, conduits 16a and 16b, and conduits 21a and 21b are made of aluminum for efficient heat transfer. It is to be understood, however, that the fins and conduits may be formed from any material having similar heat exchange properties. The fins 11 number approximately 205, and each is of a width of about 1.25 inches and a length of about 14 inches. The air space 26 is of the order of 10 millimeters in width. The conduits 16a, 16b and 21a, 21b have outer diameters of approximately 0.375 inches and inner diameters of approximately 0.25 inches. The centers of conduits 16a are displaced from the centers of conduit 16b by a distance of approximately 0.625 inches. The overall physical dimensions of heat exchanger 10 are such as to be accommodated within a space approximately 23.187 inches wide, 14 inches in height, and 1.31 inches in depth.

Side plates 12 and 13 preferably are made from steel or aluminum, while fin guards 14 and 15 may be a plastic or other material suitable for protecting the fins from damage.

In operation, high pressure refrigerant vapor is received from an air conditioning compressor at fitting 20. The vapor is condensed by the heat exchange between metallic fins 11 and the surrounding atmosphere. The condensed refrigerant is provided at fitting 19 leading to a receiver dryer (now shown).

Engine oil or transmission oil of an automotive vehicle enters fitting 25, and is cooled by the heat transfer between metallic fins 11 and the surrounding atmosphere. The cooled oil then is provided at fitting 24.

In accordance with the invention, heat flow between condenser 10a and oil cooler 10b is minimized by locating the oil cooler below the condenser rather than in the air path to the condenser, and by interposing air space 26 between the oil cooler and condenser.

FIG. 3 illustrates an oil conduit 30 which is partially cut away to expose a heat exchange insert 31 which extends the length of the conduit. The insert 31 includes four curved surfaces depending laterally from a common center and separated by approximately 90 degrees. The insert preferably is made of aluminum, and is press fitted within conduit 30. The outer surface area of the curved surfaces are formed to maximize metal to metal contact with conduit 30, and thereby provide an efficient heat transfer. It has been found that such an insert substantially improves heat exchange between the oil flowing through conduits 21a, 21b of oil cooler 10b and the air moving between metallic fins 11.

More specifically, insert 31 includes four depending fins or legs 32 each having a substantially straight root section 33 and a flexible curved tip section 34. Fins 32 are joined at a central core 35. In a preferred embodiment, insert 34 is an extruded aluminum member with the thickness of fins 32 slightly greater at the root section 33 than at the tip section 34. Tip sections 34 are formed with a curved contour as illustrated in FIG. 3 but with a diameter defined by the outermost point of the tip sections being several thousandths of an inch larger than the inner diameter of tube 30. Tip sections 34 are sufficiently thin to permit flexing of the tip sections to take on the contour of the inner surface of tube 30 when the insert is fitted into the tube.

The flexibility of the fins greatly facilitates insertion of the insert. Because the insert is slightly oversized relative to the inside diameter of the tube such that the fins must be at least slightly flexed inwardly to be inserted in the tube, the insert has the tendency to forcibly engage and thereby lay against the inside surface of the tube. Therefore, while the design of the present insert facilitates insertion of the insert into tube 30, it also provides an insert with fins which exert some pressure against the inside wall of the tube thereby assuring surface contact between each fin and the sidewall of the tube. This arrangement substantially improves the heat conduction from the fluid to the tube through insert 31.

The design of insert 31 also provides root section 33 centrally positioned in tube 30 and therefore in the center of the flow of fluid through tube 30. Heat absorbed by root section 33 is conducted by way of fins 32 to the walls of tube 30. Thus, the insert effectively provides channels for heat conduction from the central area of tube 30 to the tube sidewall for dissipation through heat exchanger 10. In turn, heat conducted to the sidewall of the tube is conducted to fins 11 of heat exchanger 10.

The contact pressure between the tip sections 34 and the inside wall of tube 30 can be increased or decreased by varying the relative size of insert 31 as well as the flexibility of the tip sections. Thus, by increasing the insert outer diameter relative to the inside diameter of tube 30, the interference fit and the contact pressure between the insert and the tube is increased. Likewise, by making the tip sections 34 of insert 31 less flexible, the engagement force between the insert and the tube for the same insert diameter will be increased.

Figure 3A:
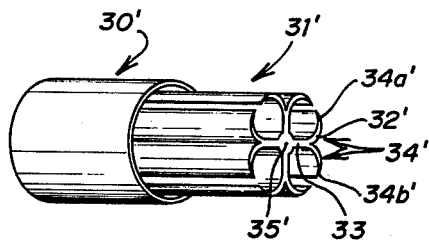
FIGS. 3a and 3b are alternative embodiments of the conduit illustrated in FIG. 3.

In an alternative embodiment illustrated in FIG. 3a, an insert 31' includes four Y-shaped fins 32' each having a relatively short root section 33' and a bifurcated flexible curved tip section 34'. Tip section 34' includes one curved section 34a' and an oppositely directed section 34b'.

The diameter of the outermost points of insert 31' is slightly larger than the inside diameter of a tube 30' in which the insert is fitted and the tip sections 34' are flexible such that the insert may be easily fitted within the tube by slightly flexing the tip sections inwardly as the insert is forced within the tube. In this way, the heat exchange contact area is substantially increased and the tendency of tip sections 34 to forcibly engage the inside wall of tube 30' assures positive heat exchange contact area between the insert and the tube. As in the preferred embodiment illustrated in FIG. 3, heat is absorbed from the fluid passing through the tube not only by fins 34' but also by root section 33' and conducted by way of fins 34' to the sidewall of tube 30'.

Figure 3B:
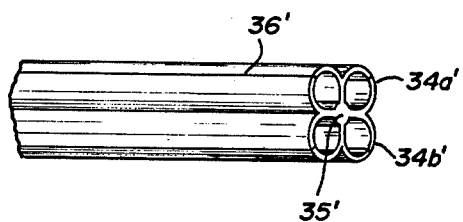

In still a further embodiment of the invention illustrated in FIG. 3b, tube 30 may be eliminated by extruding insert 31' such that each bifurcated tip sections 34a' extends to contact tip section 34b' of an adjacent tip section. At the point of contact 36', the tip sections are joined to form a continuous seam by welding or some other suitable bonding process which may be made simultaneously or immediately after extruding the insert. As shown in FIG. 3b, the tip sections are not tapered but are of uniform thickness so that they may form the side walls of the conduit. In this embodiment, a tube and heat conducting insert are combined in one monolithic structure thereby eliminating substantial material and labor required to form an insert and tube separately and to fit the insert into the tube. As with a tube fitted with a heat conduction insert, the unit 31' provides a conduit for the fluid while providing a structure extending to the central portion of the conduit for conducting heat from the central portion of the conduit to the outer surface which is in contact with cooling fins where heat from the fluid being cooled is dissipated.

Figure 4:
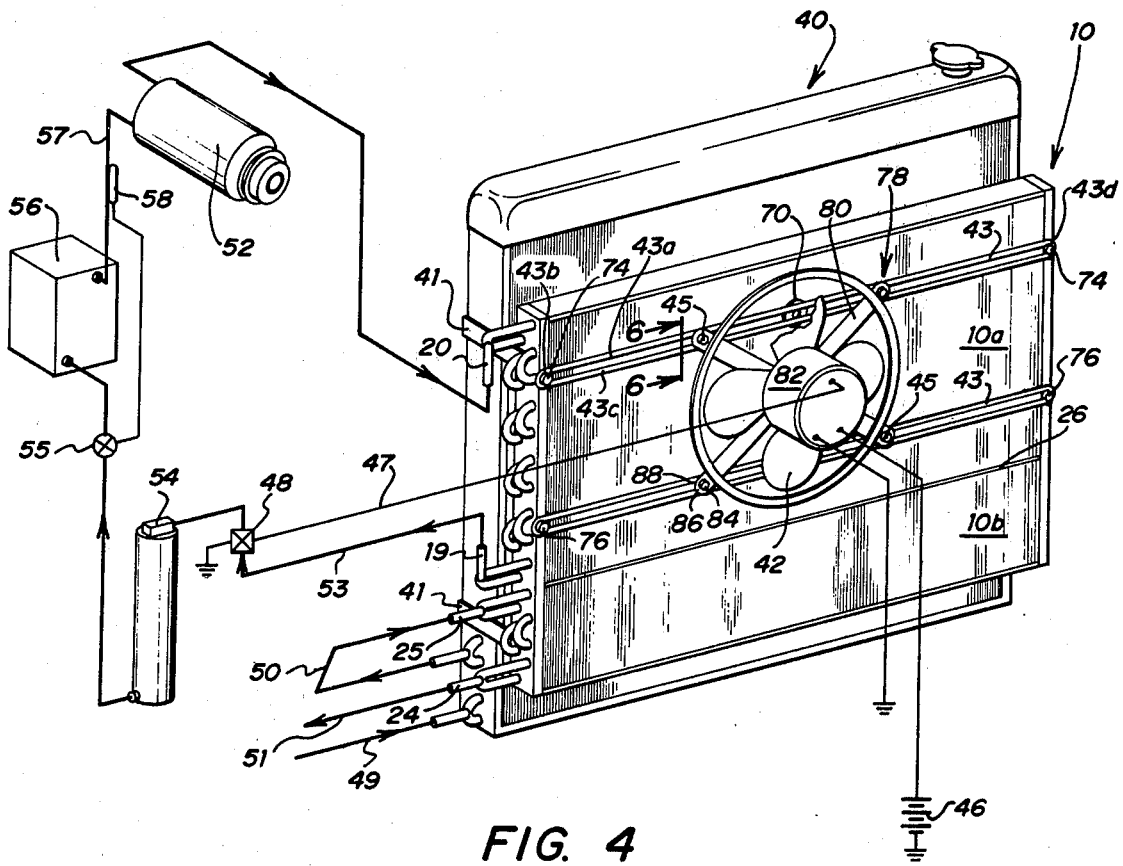
FIG. 4 is a functional electromechanical block diagram of an automobile vehicle cooling system embodying the invention.
Figure 5:
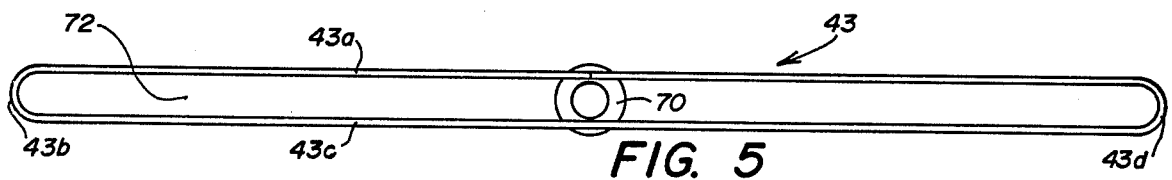
FIG. 5 is an enlarged plan view of bracket 43.

FIG. 4 is an electromechanical functional block diagram illustrating an automotive vehicle cooling system. Heat exchanger 10 is mounted to the front face of an engine radiator 40 with brackets 41. An electrically energized fan 42 is mounted on slotted brackets 43 which extend horizontally across condenser 10a of heat exchanger 10. Fan 42 may be positioned by sliding the fan along brackets 43, and may be held in place by tightening friction clamps 45. As is best seen in FIG. 5, each bracket 43 includes an upper arm 43a, a 180 degree bend 43b, a lower arm 43a and a 180 degree bend 43d. The material used to form each bracket is of an appropriate length such that the ends are adjacent one to the other after the bracket has been formed. The ends are then welded or otherwise secured to form a closed loop.

A brace 70 is attached, as by welding, to both ends of the wire rod as well as to arm 43c to add rigidity to the bracket.

As can be seen in FIG. 5, bracket 43 is formed such that upper arm 43a is parallel to lower arm 43c. This arrangement defines a uniform slot 72 intermediate of arms 43a and 43c along the entire length of the bracket being interrupted only by the positioning of brace 70. In a preferred embodiment of the invention, brackets 43 have a length substantially equal to the length of the heat exchanger or other apparatus on which the bracket is attached. Referring to FIG. 4, it is seen that brackets 43 are equal in width to condenser 10 and are attached thereto by appropriate screws 74 and 76.

Figure 6:
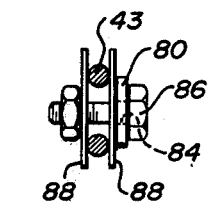
FIG. 6 is a section veiw taken along line 6—6 of FIG. 4.

Fan 42 is supported by a mounting structure 78 which includes arms 80 attached to and extending from fan housing 82. Arms 80 have apertures 84 at the outer ends thereof which receive friction clamps 45 therethrough. In a preferred embodiment of the invention, clamps 45 include a nut and bolt assembly 86 with appropriate washers 88 positioned on opposite sides of brackets 43 (FIG. 6).

The ground terminal of the electric motor driving fan 42 is connected to ground, and the voltage terminal of the motor is connected through a 12 volt DC source 46 to ground. An enable terminal of the fan motor is connected by way of a conductive line 47 to a pressure switch 48 having a ground terminal connected to ground.

Engine or transmission oil is supplied to a conduit 49 leading to the lower part of radiator 40. The oil flows through conduits extending horizontally across the radiator, and thence to a conduit 50 leading to oil cooler 10b of heat exchanger 10. The output of oil cooler 10b is supplied to a conduit 51 leading to an oil flow path.

A compressor 52 supplies a high pressure refrigerant vapor to condenser 10a of heat exchanger 10. The vapor is cooled, and the condensate is supplied to a conduit 53 which is connected to the input of pressure switch 48. The output of pressure switch 48 is in fluid communication with the input of a receiver dryer 54 which absorbs water vapor and supplies collected refrigerant condensates to a thermostatic expansion valve 55. The output of valve 55 is supplied to the input of an evaporator 56, which in turn supplies refrigerant vapors to a conduit 57 leading to the input of compressor 52. A thermostatic gas bulb 58 of valve 55 is placed in contact with conduit 57.

In the preferred embodiment, the pressure switch 48 may be of a type such as that manufactured and sold by Texas Instruments, Inc. of Versailles, Ky., and offered to the public as Model No. 20PS002KA26OR21OR. Evaporator 56 may be of a type such as that manufactured by Danhard, Inc. of Dallas, Tex., and represented to the public as Model No. UN-245. Compressor 52 may be of a type manufactured and sold by the York Division of the Borg Warner Corporation of York, Penn., and represented to the public as Model No. F209, Part No. 16764. The receiver dryer 54 may be of a type such as that manufactured and sold by Singer Control Company of America of Milwaukee, Wis., and available to the public as Model No. 70412-501. The electric motor or fan 42 may be of a type such as Model No. 8659FH manufactured and sold by Leece Nevilce Company of Cleveland, Ohio. The fan blades preferably are aluminum such as the type manufactured and sold by Brookside Corporation of McCordsville, Ind., and represented to the public as Model No. 202312-1.

In operation, oil from the transmission or engine of an automotive vehicle is supplied to conduit 49, and circulated through the lower part of radiator 40 where an initial heat exchange occurs with the coolant in the radiator. The oil then is supplied through a conduit 50 to oil cooler 10b of heat exchanger 10 where the oil is air cooled before returning to its normal flow path by way of conduit 51. The circulation of the oil through both the radiator and the oil cooler 10b provides an efficient means of cooling the oil without imparting a prohibitive amount of heat to the radiator coolant. A reserve heat capacity thus is provided in the coolant to accommodate load conditions such as the running of the air conditioning or the towing of trailers.

The high pressure refrigerant vapors supplied by compressor 52 is circulated through the condenser 10a of heat exchanger 10, where the vapor is cooled and the condensate therefrom is supplied by way of conduit 53 through pressure switch 48 to the receiver dryer 54. Pressure switch 48 is sensitive to the pressure in conduit 53, and activates fan 42 by way of conducting line 47 when the pressure head exceeds a threshold value. Receiver dryer 54 absorbs water moisture and collects the condensed refrigerant. The condensate is supplied to the thermostatic expansion valve 55 which adjusts the flow rate of the liquid refrigerant to maintain a vapor state in conduit 57. The refrigerant vapor is conduit 57 enters the suction side of compressor 52 and is compressed to a higher pressure.

The cooling of the oil and the refrigerant vapor occurs as a result of a heat exchange between the metallic fins 11 of heat exchanger 10, and the air flowing through the heat exchanger to radiator 40. As before stated, the circulation of the oil through both the radiator and the oil cooler of heat exchanger 10 provides an efficient means for cooling the oil without imparting prohibitive amounts of heat to the radiator coolant. The reserve heat capacity of the radiator coolant further is preserved by interrupting the heat transfer coolant further is preserved by and oil cooler 10b. Accordingly, the spacing between heat exchanger 10 and radiator 40 preferably is at least 0.75 inches to effectively minimize the transfer of heat therebetween. In addition, the air space 26 interrupts the heat exchange between the condenser 10a and the oil cooler 10b.

When the automotive engine is operating, the engine fan (not shown) pulls air through heat exchanger 10 and radiator 40. Further, when the vehicle is in forward motion, the refrigerants and oil circulating through heat exchanger 10 are cooled by a ram air effect supplementing the engine fan. Under severe load conditions where the engine fan and the ram air effect are not sufficient, the engine heat may increase as reflected by an increase in pressure in conduit 53. When the pressure head in conduit 53 exceeds a threshold value, however, switch 48 activates fan 42 to provide an additional air source.

Having described the invention in connection with certain specific embodiments thereof, it is to be understood that further modifications may now suggest themselves to those skilled in the art. For example, the novel features of the invention described herein may be applied to stationary engines as well as automotive vehicles. Likewise, the heat exchange tubes of the present invention may be used in any heat exchange regardless of its particular application. It is intended to cover such modifications as fall within the scope of the appended claims.

What is claimed is:
1. An insert for a heat exchange tube, comprising:
    a plurality of fins depending from a common core, said fins each having curved bifurcated ends remote from said core, said bifurcated ends of said fins being tapered and flexible to be curved in opposite directions upon insertion of the insert into the tube such that said ends are in heat exchange contact with the inside surface of the heat exchange tube.
2. The insert according to claim 1 wherein said fins extend radially from said core.
3. A heat exchange tube, comprising:
    a plurality of interconnected fins each having a root and a bifurcated tip remote from the root, and
    means for joining the bifurcated tips to the tip of an adjacent fin to form a plurality of fluid passageways along the longitudinal length of the tube.
4. The heat exchange tube according to claim 3 wherein said roots of said fins are joined to a common longitudinal core.
5. The heat exchange tube according to claim 4 wherein said fins extend radially from said core.
6. The heat exchange tube according to claim 5 wherein said fins are equal in length one to the other such that said core is coincident with the longitudinal centerline of said tube.

* * * * *

UNITED STATES PATENT AND TRADEMARK OFFICE
CERTIFICATE OF CORRECTION

PATENT NO. : 4,190,105
DATED : February 26, 1980
INVENTOR(S) : Gerhard Dankowski It is certified that error appears in the above–identified patent and that said Letters Patent are hereby corrected as shown below:

Under the heading "Foreign Patent Documents", change "of 1894" to -- 6/1894 --.

Column 1, line 50, change "of" to -- to --.

Column 3, line 16, change "automobile" to -- automotive --.

Column 3, line 19, change "veiw" to -- view --.

Column 4, line 37, change "insert 34" to -- insert 31 --.

Column 7, lines 39-40, delete "coolant further is preserved by" and insert -- between radiator 40, condenser 10a --.

Signed and Sealed this

Thirteenth Day of May 1980

[SEAL]

Attest:

SIDNEY A. DIAMOND

Attesting Officer          Commissioner of Patents and Trademarks